Nov. 3, 1925.
G. ST. J. PERROTT ET AL
1,559,980
PURIFICATION OF AIR CONTAINING AMMONIA
Original Filed Jan. 10, 1919
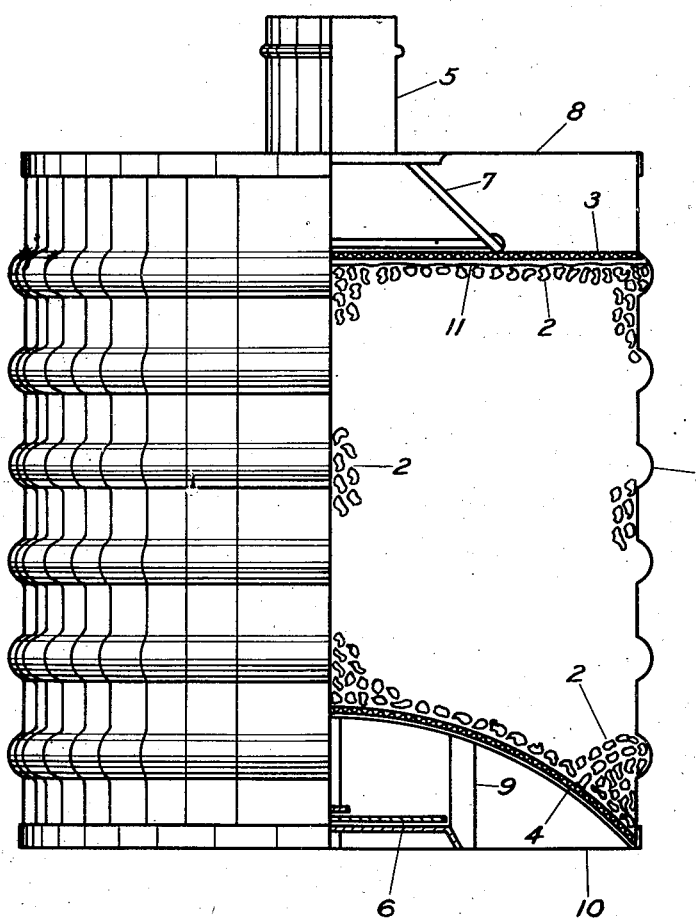

Patented Nov. 3, 1925.

1,559,980

UNITED STATES PATENT OFFICE.

GEORGE ST. J. PERROTT, OF PITTSBURGH, PENNSYLVANIA, AND MAX YABLICK, OF NEW YORK, N. Y.; SAID PERROTT ASSIGNOR TO SAID YABLICK.

PURIFICATION OF AIR CONTAINING AMMONIA.

Application filed January 10, 1919, Serial No. 270,606. Renewed July 24, 1925.

*To all whom it may concern:*

Be it known that we, GEORGE ST. J. PERROTT and MAX YABLICK, citizens of the United States, and formerly lieutenants in the Chemical Warfare Service, residing in Washington, D. C., the former now being a resident of Pittsburgh, in the county of Allegheny and State of Pennsylvania, and the latter being now a resident of New York, in the county of New York and State of New York, pray that Letters Patent may be granted to us for the Improvements in Purification of Air Containing Ammonia, of which the following is a specification.

Our invention relates to the treatment of ammonia laden air to render it suitable for breathing directly after treatment. We have discovered that by the use of certain dry, solid absorbents used in a container through which the air is drawn by the person in the act of breathing, it is possible to satisfactorily and completely absorb the ammonia from air containing any high concentration of ammonia in which a workman can remain without serious burning of the skin. This concentration may be as much as 5%. The absorbents which we employ in carrying out our invention differ from sulfuric acid or other absorbents heretofore employed for the purpose, not only in that they are solids, but they also have the following properties or characteristics when used for our purpose.

The heat of reaction under ordinary conditions of use is so low that the air being treated will not be raised in temperature to any material extent; no caustic fumes are evolved during the absorbing action; the resistance to the passage of the air is low and does not increase materially during the operation; the weight of the absorbent is low in respect to the weight of the ammonia which it is capable of absorbing; the efficiency is high for a considerable period of time; the absorbed ammonia is effectively held or retained under the conditions under which it is absorbed; and the absorbent is of low cost, easily prepared, and stable while stored for use.

Among the most efficient and cheapest substances which we have discovered to have the desired properties or characteristics are certain crystalline hydrated inorganic salts of certain metals. Where only short length of service is required, or cost is not to be considered, other compounds may be used.

In the absorbing action complex metal ammonia addition or substitution products are formed, although in many cases it is probable that a mixture of basic salt, ammonium salt and metal ammonium salt is formed. In referring to such salts as absorbents or having absorbing action, we do not wish to be understood as meaning that the action which takes place is entirely physical, as distinguished from a chemical action. The preferred substances are the salts of the metals whose atomic weights are between 52 and 66, and including chromium, manganese, iron, cobalt, nickel, copper and zinc. These, as well as certain others such as cadmium, mercury, magnesium, etc., which may be used, form addition or substitution products with ammonia, and when in the hydrated form have the water of crystallization replaced by ammonia of crystallization. These salts may be used in dry, solid form, and the heat of reaction is not sufficient to require cooling of the treated air preliminary to breathing.

In the practical application of our invention, the ammonia laden air to be treated is passed over or through the absorbent material used either by itself, or as an impregnant for such carriers as charcoal, which in itself has a well known gas absorbing action, pumice, kieselguhr, etc., powdered pumice having given good results. Our experiments show that the absorbent material gives better results when carried on one of the materials noted above than when used alone, since in the latter case the material has a tendency to powder and pack.

In general the carrier is impregnated with about fifty per cent of its weight of absorbent material. This impregnation is carried on so that the material is deposited on the carrier in a crystalline condition from a solution of the metallic salt.

One specific embodiment of our invention is given in the following example wherein pumice is impregnated with about sixty per cent of copper sulfate, pentahydrate; a known weight of 10—14 mesh pumice is placed in sufficient volume of a solution of blue-stone (technical copper sulfate) to give the ratio of one part of copper sulfate by weight to one and one-half parts of pumice. The solution is then boiled down with constant stirring until the salt has crystallized out in the pumice and is almost dry. The material is then spread out and allowed to dry in the air when it is screened on a 14 mesh sieve, thus removing the fines.

The percentage composition of the original mixture may vary from one part of copper sulfate with one part of pumice, to one part of copper sulfate with two parts of pumice. These ratios give the best compositions for all practicable purposes. In a composition of the first ratio, more material will be screened out as fines, while the second ratio gives somewhat less copper sulfate on the grains with a consequently slightly lower absorption value. Where longer life is desirable, a high impregnation may be used or one of the other absorbent materials may prove more valuable under the particular circumstances of any specific case.

Various considerations point to copper sulfate as a good general absorbent combining as it does ready availability and cheapness with its high absorption power. The following salts have given noteworthy results; zinc sulfate, nickel nitrate, ferrous sulfate, and cobalt chloride.

The above given method of impregnation is merely by way of example since any method which will give the proper subdivision of the absorbent crystals or fragments, and the supporting and spacing of them for free access by the air and ammonia, is suitable in the preparation of the absorbents or filler mass. The method disclosed is however particularly adapted to the preparation of absorbents, consisting of crystalline salts.

Our absorbents when in use are packed in a metal container, the latter having been coated with a covering of a protective paint to protect it from possible corrosion due to the ammonia or other gas or absorbent material.

The accompanying drawing illustrates an apparatus in which our absorbent material may be employed. This apparatus, the details of construction of which form no portion of our invention, comprises a canister 1, the interior surface of which is preferably coated with a protective paint. The absorbent material 2 is packed between screens 3 and 4. The neck 5 of the canister is adapted to be attached to the hose of a gas mask and air which is to be purified may enter at the base of the canister through the valve 6. Air upon being sucked past the valve 6 and through the absorbent material 2, passes out through the neck 5 to the gas mask. During the passage of the air through the absorbent material, any ammonia which it may carry will be removed therefrom by the absorbent material 2.

In order to maintain the absorbent material in compact form and in proper position, this type of canister is provided with a spring 7 which presses against the screen 3 and the top 8 of the canister, and also a spring 9 which presses against the dome-shaped screen 4 and the base 10 of the canister. A layer of fabric 11 may also be provided to remove particles of dust from the air before it passes into the neck 5.

There is a further fact which is to be emphasized in connection with our invention, namely the fact that the ammonia after absorption by the materials described may be readily recovered by the simple expedient of exposing this used absorbent material to decreased pressure or increased temperature. The ammonia may be recovered while the absorbent is regenerated. It is also to be noted that the fact that the absorbed gas is readily given off in some cases under reduced pressure, shows that the absorption may be primarily a physical phenomenon.

The readiness with which our absorbents give up the absorbed gases under changed conditions render them particularly valuable as it is only necessary to remove the absorbent and expose it to changed or altered physical conditions, that is, lower pressure or higher temperature, and the absorbed gas is given off and the absorbent material is regenerated and is available for further use.

The only absorbents which are suitable for use in carrying out our invention are those compounds whose lowest ammonia addition or substitution product has an ammonia vapor pressure of practically zero at the temperature and pressure at which it is to be used, that is, the temperatures within which a person may work for an appreciable length of time and breathe air drawn through the absorbent.

Having thus described our invention, what we claim as new and desire to secure by Letters Patent is:

1. In an apparatus for treating ammonia-laden air to completely remove the ammonia therefrom and render the air suitable for breathing directly after treatment and without objectionable heating, a container adapted for the passage of the air therethrough and having therein a carrier of granular form with small crystals of hydrated copper sulfate formed thereon.

2. The process of purifying air vitiated with a high concentration of ammonia, to render the air suitable for breathing after purification and without intermediate cooling or other treatment, which consists in passing the air through a dry, solid, granular mass, containing crystals of hydrated copper sulfate.

3. The process of treating ammonia-laden air to render the air suitable for breathing directly after treatment, which process consists in the single step of passing the ammonia-laden air into intimate contact with a mass including hydrated crystals of an inorganic salt of a metal having an atomic weight between 52 and 66, and which acts to unite with the ammonia to completely remove the ammonia from the air and without generating caustic fumes or producing material heating effect on the air.

4. An apparatus for purifying air vitiated with ammonia, to render it suitable for breathing, including a container through which the ammonia-laden air may be passed, and having therein an absorbent filler of solid material offering but comparatively low resistance to the passage of the air therethrough, and including a compound of a metal having an atomic weight between 52 and 66, and capable of forming at ordinary breathing temperatures stable products with the ammonia, and without generation of excessive heat or liberation of caustic fumes.

5. An apparatus for treating ammonia-laden air to completely remove the ammonia therefrom and render the air suitable for breathing directly after treatment and without objectionable heating, including a container adapted for the passage of air therethrough, and having therein a filling of charcoal with small crystals of copper sulfate formed thereon.

6. An apparatus for purifying air vitiated with ammonia to render it suitable for breathing, including a container through which the ammonia-laden air may be passed, said container having an absorbent filler of solid material offering but comparatively low resistance to the passage of the air therethrough, and including a carrier of granular form, the granules having formed thereon crystals of a metallic compound which at ordinary breathing temperatures unite with the ammonia to completely remove the latter from the air and form stable metal ammonia compounds without generation of excessive heat or liberation of the caustic fumes.

7. An apparatus for purifying air vitiated with ammonia to render it suitable for breathing, including a container through which the ammonia-laden air may be passed, and having therein a dry filler including hydrated crystals of a salt of a metal which at ordinary breathing temperatures unite with the ammonia to completely remove the latter from the air and form stable products with the ammonia, without generation of excessive heat or liberation of caustic fumes, and means for preventing packing of said crystals or said products, and providing air passages whereby the crystals are exposed for access of air and the filler offers but comparatively low resistance to the passage of the air therethrough.

8. An apparatus for purifying air vitiated with ammonia to render it suitable for breathing, including a container through which the ammonia-laden air may be passed, and having therein a dry filler including hydrated crystals of a metallic sulfate which at ordinary breathing temperatures unite with the ammonia to completely remove the latter from the air and form stable products with the ammonia, without generation of excessive heat or liberation of caustic fumes, and means for preventing packing of said crystals or said products, and providing air passages whereby the crystals are exposed for access of the air and the filler offers but comparatively low resistance to the passage of the air therethrough.

9. An apparatus for purifying air vitiated with ammonia to render it suitable for breathing, including a container through which the ammonia-laden air may be passed, and having therein a dry filler including a metallic compound which unites with ammonia to form a stable product having an ammonia vapor pressure of practically zero at the temperature and pressure of use, and means for preventing packing of said compound and said products, and providing air passages whereby the compound is exposed for access of the air and the filler offers but comparatively low resistance to the passage of the air therethrough.

10. An apparatus for purifying air vitiated with ammonia to render it suitable for breathing, including a container through which the ammonia-laden air may be passed, and having therein a dry filler including a metallic compound which unites with ammonia to form ammonia addition or substitution products without generating noxious fumes and without material heating effect on the air, the lowest of such formed products having an ammonia vapor pressure of practically zero at the temperature and pressure of use.

GEORGE ST. J. PERROTT.
MAX YABLICK.